United States Patent [19]

Pochard et al.

[11] Patent Number: 4,878,951
[45] Date of Patent: Nov. 7, 1989

[54] LOW-FOAMING ALKALINE, HYPOCHLORITE CLEANER

[75] Inventors: Guy Pochard, Minnetonka; Creighton Steiner, Brooklyn Park, both of Minn.

[73] Assignee: A & L Laboratories, Inc., Minneapolis, Minn.

[21] Appl. No.: 297,422

[22] Filed: Jan. 17, 1989

[51] Int. Cl.$^4$ .................. C11D 1/22; C11D 3/395; B08B 9/00

[52] U.S. Cl. .................. 134/22.17; 134/34; 134/42; 252/95; 252/99; 252/103; 252/DIG. 14

[58] Field of Search ............ 252/95, 99, DIG. 14, 252/103; 134/22.17, 42, 34

[56] References Cited

U.S. PATENT DOCUMENTS

| | | |
|---|---|---|
| 3,172,861 | 3/1965 | Steinhauer et al. |
| 3,645,906 | 2/1971 | Valenta et al. |
| 4,071,463 | 1/1978 | Steinhauer ............ 252/103 |
| 4,174,289 | 11/1979 | Sorgenfrei et al. ........ 252/103 |
| 4,206,069 | 6/1980 | Borrello |
| 4,552,680 | 11/1985 | Hartman et al. ......... 252/102 |
| 4,579,676 | 4/1986 | Bull ............. 252/94 |
| 4,687,591 | 8/1987 | Castaldo |
| 4,740,327 | 4/1988 | Julemont et al. |
| 4,759,867 | 7/1988 | Choy et al. |

FOREIGN PATENT DOCUMENTS

| | | |
|---|---|---|
| 1146834 | 5/1983 | Canada |
| 63184 | 5/1977 | Japan |
| 5461 | 7/1988 | PCT Int'l Appl. |

OTHER PUBLICATIONS

Dow Chemical Co. Product Brochure "Formulating High Performance Cleaning Products with DOWFAX Anionic Surfactants", (1985).
Chem. Abst., 75: 153190k (1971).

*Primary Examiner*—Prince E. Willis
*Attorney, Agent, or Firm*—Vidas & Arrett

[57] ABSTRACT

Cleaning formulations suitable for cleaning equipment which circulates food products, such as dairy products, in place. The formulations are alkaline compositions containing a source of available chlorine (suitably hypochlorite) and including a mixture of surfactants one of which is a $C_4$–$C_6$ alkylated diphenyloxide sulfonate and the other of which is a nonionic surfactant which is stable in the formulation within certain concentration ranges and which acts to suppress foaming.

14 Claims, No Drawings

LOW-FOAMING ALKALINE, HYPOCHLORITE CLEANER

FIELD OF THE INVENTION

The present invention relates to a novel liquid alkaline, hypochlorite cleaner composition having incorporated into it surfactants which exhibit low-foam properties. The formulation is useful in mechanical cleaning systems, such as spray or liquid circulation systems. Such cleaning systems are widely employed in food processing industries and on dairy farms or for removing food soils from milk and other food handling equipment.

BACKGROUND OF THE INVENTION

In the current art, liquid alkaline, hypochlorite compositions are commonly employed in such applications. Such compositions generally contain strong alkali, suitably, potassium or sodium hydroxide, in the range of 5 to 15% to saponify fats; sodium or potassium hypochlorite at levels providing 1.5 to 4% available chlorine to break down protein; and suitable levels of various hypochlorite stable chelating and/or sequestering agents to tie up the water hardness minerals at the desired product usage level.

In usage, the concentration of the products of this type is diluted with water at ratios of between about 1:320 (1 oz. cleaner to 5 gallons of water) to about 1:40 (1.5 oz. cleaner per gallon water). Most of these compositions result in satisfactory cleaning results provided the mechanical effect, temperature, and time of the wash cycle is sufficient. However, in the case of difficult cleaning conditions due to the design or nature of the equipment or other conditions, such as high soil loads, too low cleaning temperature or lack of time of cleaning, the current art of alkaline hypochlorite cleaners do not provide satisfactory results.

One way to overcome these cleaning difficulties would be to improve the performance of the cleaner composition. This could be accomplished by the lowering of surface tension and interfacial tension by introducing a surface-active agent into the composition. It has long been established that lowering surface tension of the cleaning solution increases its cleaning properties. More recently, studies made by scanning electron microscope of stainless steel surfaces demonstrate that microscopic ridges and grooves are present which allow the enhanced attachment and growth of bacteria which then contaminates food or milk that comes into contact with it. The improved surface cleaning properties of alkaline, hypochlorite compositions containing surface active agents may reduce entrapped food particles and microorganisms harbored in these surface irregularities, in addition to the general enhancement of emulsification of fats and removal of proteinaceous soil loads.

The current art does not allow for the incorporation of satisfactory surfactants into such cleaning compositions. Some surfactants which are relatively stable to hypochlorites are not soluble in such systems containing high concentrations of electrolyte salts. Various surfactants which show stability to hypochlorites and are electrolyte tolerant to high levels of neutral salts show poor hypochlorite stability in more strongly oxidative, highly alkaline hypochlorite solutions typical of the food industry and dairy equipment cleaners. Furthermore, the few surfactants which overcome the aforementioned stability problems foam to such a high degree as to preclude their use in mechanical cleaning systems.

Typical mechanical cleaning in the food industries and dairy farm are performed by circulation and/or spraying and are termed C.I.P. (clean-in-place) or C.O.P. (clean-out-of-place). C.I.P. systems operate under especially demanding conditions using high-fluid velocities, high pressure and/or vacuum, spray, etc. such that even low to moderate foaming surfactants generate extremely high foam. This in turn leads to a decrease in cleaning performance by inhibiting the proper functioning of the C.I.P. system, and in extreme cases may even lead to the shutdown of the system. Milking equipment C.I.P. systems are certainly the most challenging equipment to clean. The relative vacuum existing in such systems during cleaning, combined with relatively low operating temperatures, air intake, and saponifications of milk soil tend to make cleaning solutions high foaming.

DESCRIPTION OF THE PRIOR ART

Dow Chemical Co. product brochure "Formulating High-Performance Cleaning Products with DOWFAX Anionic Surfactants" (1985) describes alkylated diphenyloxide disulfonate surfactants, reports that they are stable in bleach and strongly alkaline solutions, and states that foaming can be depressed by use of low-foaming non-ionic surfactants. This reference also indicates that such disulfonate surfactants can be used to couple nonionic surfactants into solution and that such coupling ability improves as the length of the alkyl side chain decreases. There is no suggestion, however, that a nonionic surfactant would show improved hypochlorite stability in such formulations.

U.S. Pat. No. 3,172,861 teaches that bleach and alkylated diphenyloxide sulfonates give high foaming formulations.

U.S. Pat. No. 4,206,069 discloses a solid soap formulation which includes a surfactant ingredient. The surfactant may be a paraffin disulfonate and/or a nonionic surfactant such as an ethoxylated polyoxypropylenated ethylene or propylene glycol. There is a suggestion that mixtures of sulfonate and nonionic surfactants give low foaming formulations useful at high temperatures. However, this reference does not suggest either the use of diphenyloxide sulfonate surfactants or a formulation which involves bleach.

U.S. Pat. No. 4,759,867 discloses a hard surface acid cleaner which employs an acid surfactant which may be a diphenyloxide disulfonate and a defoamer, such as a polydialkylsiloxane or "various cationic or nonionic surfactants". Nothing is said in this reference about bleach and the pH is no more than about 6.5.

U.S. Pat. No. 4,687,591 discloses aerosol metal cleaning formulations which have a pH in the range of 6.5–7.5. The formulation includes an anionic surfactant, such as a diphenyloxide disulfonate and a colloidal foam preventer. The only example is a product called Colloid 581-B manufactured by Colloids, Inc. of Newark, N.J.

Chem. Abst., 75: 153190k (1971) discloses a liquid detergent which employs a benzene sulfonate detergent and a nonionic surfactant such as $R^1(OPr)_y(OEt)_xOH$. $R^1$ is not defined in the abstract. There is no disclosure of a disulfonate surfactant in the abstract. The formulation does not appear to include hypochlorite.

U.S. Pat. No. 3,645,906 describes formulations of diphenyloxide disulfonate with other anionic or nonionic surfactants for making clear solutions of hydrophobic liquids in water.

U.S. Pat. No. 4,740,327 describes a thixotropic dishwasher formulation which includes chlorine bleach, a diphenyloxide disulfonate surfactant and a foam depressant such as an alkyl phosphonic or phosphate acid ester or "silicones and etc.".

Canada No. 1,146,834 discloses an oil recovery formulation of (1) a diphenyloxide disulfonate, (2) a petroleum sulfonate, (3) a condensation product of a $C_8$–$C_{16}$ alkanol and a $C_2$–$C_3$ alkylene oxide (which may be a mixture of $C_2$ and $C_3$ alkylene oxides) and (4) a glycol ether.

SUMMARY OF THE INVENTION

The present invention pertains to improved cleaning formulations suitable for cleaning equipment which circulates food products such as dairy products in place. The cleaner is especially suited to cleaning milking and milk handling equipment in place on farms and in commercial dairys.

The formulations of the invention are alkaline compositions containing a source of available chlorine (suitably hypochlorite) and including a mixture of surfactants one of which is an alkylated diphenyloxide sulfonate and the other of which is a nonionic surfactant which is stable in the formulation within certain ranges and which acts to suppress foaming. More specifically the formulations are aqueous compositions comprising:

(a) an alkaline hydroxide in an amount equivalent to about 5%–15% sodium hydroxide;

(b) a component such as hypochlorite compound providing available chlorine at a level of between about 1% and about 5% chlorine;

(c) between about 0.1% and about 2% of a surfactant mixture comprising (i) a sulfonate surfactant selected from the group consisting of alkyl diphenyloxide sulfonates having one or two alkyl groups and one or two sulfonate groups, the alkyl groups being linear or branched $C_4$–$C_8$ alkyl groups, and (ii) a nonionic surfactant selected from the group consisting of poly(oxyethylene)/poly(oxypropylene) block copolymers and polyalkoxylated hydrophobic base compounds such as a linear or branched aliphatic alcohol, suitably a $C_4$–$C_{10}$ aliphatic alcohol; and (d) 0% to about 15% of a water softening agent stable to the other components of the formulation, said sulfonate and nonionic surfactants being present in a ratio of between about 2.5:1 and 3.5:1 and said nonionic surfactant selected to provide a substantially clear solution when combined with the remaining ingredients of the formulation.

DETAILED DESCRIPTION OF THE INVENTION

As used herein the term "active chlorine" refers to chlorine equivalent of the $I_2$ liberated from potassium iodide when the "active chlorine" containing agent is titrated with sodium thiosulfate in acid solution. See Milwidsky, et al., Detergent Analysis, Halstead Press, N.Y., (1982) pp 103–137. Since each hypochlorite ion releases one molecule of $I_2$ (equivalent to one molecule of $Cl_2$, MW 71) in this titration, sodium hypochlorite (MW 74) has an "active chlorine" equivalent of 95%.

In general liquid alkaline chlorinated C.I.P. cleaners commonly contain 5 to 15% sodium or potassium hydroxide, approximately 1.5 to 4% sodium or potassium hypochlorite and various amounts of chelating and sequestering agents. In addition, they may also contain sodium or potassium silicates. These conventional ingredients are likewise employed in the composition of the invention at conventional levels.

There are two surfactants present in this new composition, one being a high foaming sulfonate surfactant, the other being a nonionic surfactant which functions as a defoamer at temperatures above its cloud point.

The sulfonate surfactant is present in the greater concentration and contributes to most of the wetting. It is hypochlorite and alkali stable, but cannot be incorporated alone due to its high-foam characteristics. Hence, the nonionic surfactant which acts to defoam the sulfonate surfactant over a wide range of cleaning temperatures. Typical temperatures provided by a dairy farm milking equipment cleaning system may be as high as 140°–165° F. at the start of the cleaning cycle but can often cool to as low as 90° by the end of the cycle. The nonionic surfactant is by itself not soluble in such detergent compositions, nor stable to hypochlorite. However the sulfonate surfactant apparently associates in solution with the nonionic surfactant by forming a micelle which solubilizes it and serves to help provide steric hindrance to attack by the oxidative effects of the hypochlorite radical.

The alkylated diphenyloxide sulfonate surfactant is selected from compounds in which the alkyl groups are $C_4$–$C_8$ alkyl groups, suitably $C_6$ alkyl groups. Most preferably this compound is a dialkyl diphenyloxide disulfonate. Such compounds are sold under the Dowfax trademark by Dow Chemical Company. In particular, Dowfax XDS 8292.00, a dialkyl diphenyloxide sulfonate in which the alkyl groups are linear 6-carbon groups has been found to be a suitable sulfonate surfactant in the formulations of the invention. Alkylated diphenyloxide disulfonate surfactants in which the alkyl groups are $C_{10}$ or higher (such as Dowfax 3B2, 2A1 and XDS 8390.00) have been found to give unacceptable performance in formulations of the invention because of their inability to form clear solution with the nonionic surfactant component at the levels of nonionic surfactant necessary to control the foam level.

The useful levels of the surfactant compounds are significantly restricted by the need to maintain available chlorine and to suppress foam. The diphenyloxide sulfonate component provides good stability in alkaline hypochlorite and very good cleaning performance but unacceptable foaming behavior. If foam suppression is accomplished using excessively high levels of nonionic surfactant, hypochlorite stability is poor. At ratios of sulfonate/nonionic surfactant between 2.5:1 and 3.5:1 acceptable foam suppression and hypochlorite stability can be achieved. Most preferably the ratio of sulfonate to nonionic surfactant is about 3:1.

The nonionic surfactants are selected from those which will form clear solutions at 120° F. when incorporated into the formulations of the invention at the levels specified above. Preferred nonionic surfactants are sold under the trademarks Plurafac RA and Macol by BASF Wyandotte Corp. and PPG/Mazer Corp., respectively. In particular, the compounds sold under Plurafac RA-40 and Macol 21 give formulations with acceptable foam levels for clean-in-place dairy milking systems when compounded with the remaining ingredients of the formulation in the ratios previously stated. Plurafac RA-40 is described by the manufacturer as a straight chain primary alkoxylated alcohol having a cloud point (1% aqueous soln.) of 25° C., a Ross-Miles foam height of 0 and an HLB value at 25° C. of 7. Macol 21 is described by its manufacturer as a liquid ethoxylated hydrophobic base compound (believed to be an aliphatic alcohol) having a viscosity of 70 cps at 25° C., a specific gravity of 0.97 at 25° C., an average mol wt. of 820, a cloud point (1% aqueous soln.) of 24° C., a dynamic foam height (0.1% aqueous soln., 400 ml/min, 49° C.) of 5 mm, and an HLB value of 7. The alkoxylation of both Plurafac RA-40 and Macol 21 is understood to come from a mixture of ethylene oxide and propylene oxide.

Somewhat less preferred are ethylene oxide/propylene oxide block copolymers such as sold under the Pluronic trademark by BASF Wyandotte Corp. In a representative formulation Pluronic L-82 formed a clear solution at levels of sulfonate to nonionic surfactant of about 3.2:1.

The invention is illustrated by the following non-limiting examples.

EXAMPLE I:

A typical C.I.P. cleaner composition (sodium based salts) was prepared as follows:

Detergent Composition

| Ingredients | % by weight |
|---|---|
| Caustic soda 50% | 20.00 |
| Sodium hypochlorite 15% | 20.00 |
| Sequestering agents | 7.50 |
| Soft water | 52.50 |

Foam tests were run on a dairy farm C.I.P. system, Universal model #30080, using a water temperature of 110° F. As the water in the system circulated, the detergent composition was added to give a concentration of 1 oz. per gallon of water. Next, an amount of Dowfax 3B2 (di($C_{10}$)alkyl diphenyloxide disulfonate) and Plurafac RA-40 (nonionic defoamer) which had been mixed together in a certain ratio were added in various amounts to determine at what point the wash solution no longer had controlled foam. Several trials were performed using different ratios of the surfactants, the results are shown in Table 1. The results are expressed as a percent of the amount of detergent composition added. Similar results are obtained if Dowfax XDS8292.00 (di($C_6$)alkyl diphenyloxide disulfonate) is used in place of Dowfax 3B2.

TABLE 1

| Surfactant added as % of detergent composition | Ratio of Sulfonate to Nonionic Surfactant | | | |
|---|---|---|---|---|
| | 2.5:1 | 3:1 | 4:1 | No Defoamer |
| | Foam Level | | | |
| 0.5% | — | — | — | high |
| 1.0% | controlled | controlled | high | high |
| 2.0% | controlled high | controlled high | high | — |

The results in Table 1 demonstrate that the 4:1 ratio caused such high foam levels that the C.I.P. system had to be shut down. This was also true for the control with only sulfonate surfactant, no defoamer. It also illustrates that at ratios of 2.5:1 and 3:1 the amount of surfactant to achieve controlled foam expressed as a percent of the dairy detergent (surfactant being added to wash solution and not part of composition) should be less than about 2% of the formula.

EXAMPLE II:

The objective of this example was to select a defoaming nonionic surfactant which would be solubilized by the sulfonate surfactant into a detergent formula 1 such as listed in Example I.

A test solution was prepared as follows where the active surfactant Dowfax to nonionic surfactant ratio is 3:1:

| | |
|---|---|
| Detergent composition (see example I) | 196.55 grams |
| Sulfonate surfactant (Dowfax XDS 8292.00 45% soln.) | 3.00 |
| Defoaming nonionic surfactant | 0.45 |

The two surfactants were mixed together first and then added to the detergent formula, the temperature of the solution being 70° F. It was noted if the solution was clear or hazy. If hazy, an amount of the sulfonate surfactant was added to just clear the solution. The resulting solution was then heated to 100° F.; and again, if the solution was hazy, more sulfonate surfactant was added to clear. This was again repeated at 120° F. For samples which were near the 3:1 ratio at 120° F., an 8-day storage test at 50° C. (122° F.) was performed to examine hypochlorite stability.

The results of the solubility tests listed in Table 2 show that several nonionic surfactants give clear solutions at 70° F. when coupled into detergent 1 composition using Dowfax XDS 8292.00 as the solubilizer. However, at 120° F. only Plurafac RA-40 and Macol 21 give clear solutions at a 3:1 sulfonate to nonionic.

TABLE 2

| TRADENAME | SOLUBILITY AT 70° F. | GMS. SULFONATE SURFACTANT TO CLEAR SOLUTION | SOLUBILITY AT 100° F. | CUMULATIVE GMS. SULFONATE SURFACTANT TO CLEAR SOLUTION | SOLUBILITY AT 120° F. | CUMULATIVE GMS. SULFONATE SURFACTANT TO CLEAR SOLUTION |
|---|---|---|---|---|---|---|
| PLURONIC 34R2 | I | 1.7 | I | NT | I | >60 |
| PLURONIC 17R1 | I | 0.49 | I | 7.4 | I | 18.4 |
| PLURONIC L-61 | C | | C | | H | 1.0 |
| PLURONIC L-82 | C | | C | | H | 0.2 |
| PLURONIC L-101 | C | | H | 1.2 | I | 6.0 |
| PLURAFAC | | | | | | |

TABLE 2-continued

| TRADENAME | SOLU-BILITY AT 70° F. | GMS. SULFONATE SURFACTANT TO CLEAR SOLUTION | SOLU-BILITY AT 100° F. | CUMULATIVE GMS. SULFONATE SURFACTANT TO CLEAR SOLUTION | SOLU-BILITY AT 120° F. | CUMULATIVE GMS. SULFONATE SURFACTANT TO CLEAR SOLUTION |
|---|---|---|---|---|---|---|
| RA-40 | C | | C | | C | |
| PLURAFAC RA-43 | C | | C | | I | 3.3 |
| T DET LF 416 | I | 1.1 | I | 2.1 | I | 6.3 |
| MACOL 21 | C | | C | | C | |
| MACOL LF-100 | H | 0.3 | I | 1.8 | I | 4.3 |
| MACOL LF-120 | I | 0.7 | I | 0.8 | I | 2.2 |

C = CLEAR
H = LIGHT HAZE
I = INSOLUBLE
NT = NOT TESTED

EXAMPLE III:

The dialkyl diphenyloxide disulfonate surfactants Dowfax 2A1, 3B2, XDS 8292.00, and XDS 8393.00 were compared as solubilizing agents for Macol 21 in the detergent formulation given in example I. The formula was 98.275% of the detergent formula, 0.225% Macol 21, and one of the Dowfax surfactants at 1.50%. The Dowfax surfactant and Macol 21 were premixed before addition to the alkaline, chlorinated detergent. Solutions with Dowfax 2AI, 3B2, or XDS 8393.00 were insoluble. The solution with Dowfax XDS 8292.00 was clear.

EXAMPLE XV:

A series of alkaline, chlorinated C.I.P. cleaners were prepared with a constant amount of Dowfax XDS 8292.00 together with various amounts of either Macol 21 or Silwet S-77 as the defoaming agent. Silwet S-77, manufactured by Union Carbide is a polyalkylene oxide modified polydimethyl siloxane. This non-emulsion type ethoxylated silicone was coupled into solution by the sulfonate surfactant. Its hypochlorite stability versus Macol 21 were compared by storage at 50° F. for a period of ten days. This accelerated aging test is roughly equivalent to 6 months or more of storage at a room temperature of 72° F. The compositions and their results are listed in Table 3.

TABLE 3

| INGREDIENT | A | B | C | D | E | F | G | H | I | J | K | L |
|---|---|---|---|---|---|---|---|---|---|---|---|---|
| SOFTWATER | 52.50% | 50.73% | 50.755% | 50.755% | 50.633% | 50.755% | 44.000% | 42.230% | 42.255% | 42.275% | 42.163% | 42.255% |
| 2-PHOSPHONOBUTANE-1,2,4 TRICARBOXYLIC ACID 50% (BAYHIBIT AM) | 0.5 | 0.5 | 0.5 | 0.5 | 0.5 | 0.5 | 1.0 | 1.0 | 1.0 | 1.0 | 1.0 | 1.0 |
| CAUSTIC SODA 50% | 20.0 | 20.0 | 20.0 | 20.0 | 20.0 | 20.0 | 26.0 | 26.0 | 26.0 | 26.0 | 26.0 | 26.0 |
| SODIUM POLYACRYLATE 50% (GOODRITE K7058N) | 7.0 | 7.0 | 7.0 | 7.0 | 7.0 | 7.0 | 8.0 | 8.0 | 8.0 | 8.0 | 8.0 | 8.0 |
| SODIUM HYPOCHLORITE BLEACH (14%) | 20.0 | 20.0 | 20.0 | 20.0 | 20.0 | 20.0 | 21.0 | 21.0 | 21.0 | 21.0 | 21.0 | 21.0 |
| DOWFAX XDS 8292.00 | — | 1.5 | 1.5 | 1.5 | 1.5 | 1.5 | — | 1.5 | 1.5 | 1.5 | 1.5 | 1.5 |
| MACOL 21 | — | 0.27 | 0.245 | 0.225 | — | — | — | 0.27 | 0.245 | 0.225 | — | — |
| SILWET S-77 | — | — | — | — | 0.3375 | 0.245 | — | — | — | — | 0.3375 | 0.245 |
| RATIO: SULFONATE TO NONIONIC SURFACTANT | — | 2.5:1 | 2.75:1 | 3:1 | 2:1 | 2.75:1 | — | 2.5:1 | 2.75:1 | 3:1 | 2:1 | 2.75:1 |
| ACTIVE BASIS INITIAL % NaOCL | 2.77 | 2.72 | 2.73 | 2.73 | 2.68 | 2.69 | 2.89 | 2.85 | 2.85 | 2.84 | INSOLUBLE | 2.8 |
| FINAL % NaOCL (10 DAYS @ 50° C.) | 1.92 | 1.10 | 1.24 | 1.70 | 0.39 | 0.91 | 1.53 | 1.16 | 1.25 | 1.32 | — | 0.1 |
| % NaOCL RETENTION | 69.3 | 40.03 | 45.6 | 62.3 | 14.6 | 33.8 | 52.9 | 40.7 | 43.9 | 46.5 | — | 3.5 |

All of the silicone defoamer compositions E, F, and L exhibited poor hypochlorite stability. Composition K was insoluble. Composition F, which showed better stability than the other silicone samples, demonstrated extremely high foam in the C.I.P. system at 1 oz/2 gal. when tested as in example I. Insolubility and hypochlorite instability problems, as well as inadequate defoaming performance prevents the usage of this class of defoaming chemicals in this product type and its application.

Compositions B, C and D showed increasing hypochlorite stability as the sulfonate to defoamer ratio increased. Composition D has a commercially acceptable shelf life, not substantially lower than the control composition A. After 10 days at 50° C. composition D has a % NaOCl retention of approximately 62%, whereas the control composition, without any surfactants, had a % NaOCl retention of approximately 69%. These results indicate that for storage for 10 days at 50° C., roughly equivalent to 6 months or greater at room temperature, the sulfonate surfactant shielded the defoaming nonionic surfactant from attack by the hypochlorite radical quite effectively.

Sample A and D were maintained in storage at 50° C. were another 10 days. After 20 days at 50° C. (equivalent roughly to greater than one year at room temperature) the % NaOCl retention of composition D was 25.0%, compared to 48.7% for the control sample A. Thus, only upon very extended storage do the hypochlorite stabilities diverge substantially.

Samples G through L were tested to determine if more concentrated products could be formulated; namely, the effect of greater sodium hydroxide concentration on hypochlorite stability. Compositions J at 46.5% NaOCl retention is closest in stability to the control composition G at 52.9% retention, but, the small increase in sodium hydroxide had as strong negative effect on stability for all formulations, indicating that compositions more concentrated than D are not preferred.

The present disclosure is an exemplification of the principles of the invention and is not intended to limit the invention to the particular embodiments illustrated. By employing particular attention to the ratio of sulfonate surfactant to the defoaming nonionic surfactant, and to the concentrations of hydroxide and hypochlorite, liquid alkaline chlorinated C.I.P. cleaners with acceptable shelf-life and controlled foam characteristics can be readily formulated within the scope of the claims appended hereto.

What is claimed is:

1. An aqueous alkaline chlorinated cleaning formulation comprising:
    (a) an alkaline hydroxide in an amount equivalent to about 5% - 15% sodium hydroxide;
    (b) a component providing available chlorine at a level of between about 1% and about 5% available chlorine;
    (c) between about 0.1% and about 2% of a surfactant mixture comprising (i) a sulfonate surfactant selected from the group consisting of alkyl diphenyloxide sulfonates, having one or two alkyl groups and two sulfonate groups, the alkyl groups being linear or branched $C_4$-$C_8$ alkyl groups, and (ii) a nonionic surfactant selected from the group consisting of poly(oxyethylene)/poly(oxypropylene) block copolymers and polyethoxylated/polypropoxylated aliphatic alcohols; and
    (d) 0 to about 15% of a water softening agent stable to the other components of the formulation, said sulfonate and nonionic surfactants being present in a ratio of between about 2.5:1 and 3.5:1 and said nonionic surfactant selected to provide a substantially clear solution at about 120° F. when combined with the remaining ingredients of the formulation.

2. A formulation as in claim 1 wherein the sulfonate surfactant is a dialkyl diphenyloxide disulfonate.

3. A formulation as in claim 2 wherein the alkyl groups on the sulfonate surfactant are linear groups having an average of about six carbon atoms.

4. A formulation as in claim 1 wherein the water softening agent is selected from the group consisting of silicate, phosphate, phosphonate and polyacrylate softening agents and mixtures thereof.

5. A formulation as in claim 4 wherein the water softening agent is an alkali polyacrylate salt.

6. A formulation as in claim 1 wherein the alkali hydroxide is sodium or potassium hydroxide or a mixture thereof.

7. A formulation as in claim 1 wherein the available chlorine providing component is sodium or potassium hypochlorite or a mixture thereof.

8. A formulation as in claim 1 wherein the nonionic surfactant is a polyethoxylated/polypropoxylated $C_4$-$C_{10}$ linear or branched aliphatic alcohol.

9. A formulation as in claim 1 wherein the nonionic surfactant has a cloud point (1% aqueous solution) of about 24°-25° C.

10. A formulation as in claim 9 wherein the nonionic surfactant gives a dynamic foam height (0.1% aqueous solution, 400 ml/min, 49° C.) of 5 mm or less.

11. A formulation as in claim 9 wherein the nonionic surfactant has a HLB value of about 7.

12. A method of cleaning-in-place equipment used to circulate food products comprising:
    (a) providing a formulation as in claim 1;
    (b) diluting said formulation with water at a ratio of between about 1:320 and 1:40; and
    (c) circulating the diluted formulation through the said equipment to be cleaned at a temperature of above 90° F.

13. A method as in claim 12 wherein the diluted formulation temperature is between about 90° F. and 165° F. when circulated through the equipment.

14. A method as in claim 12 wherein the equipment to be cleaned is milk handling equipment.

* * * * *